Oct. 28, 1947. F. S. LAPEYRE ET AL 2,429,828
SHRIMP PEELER
Filed July 25, 1944 4 Sheets-Sheet 3

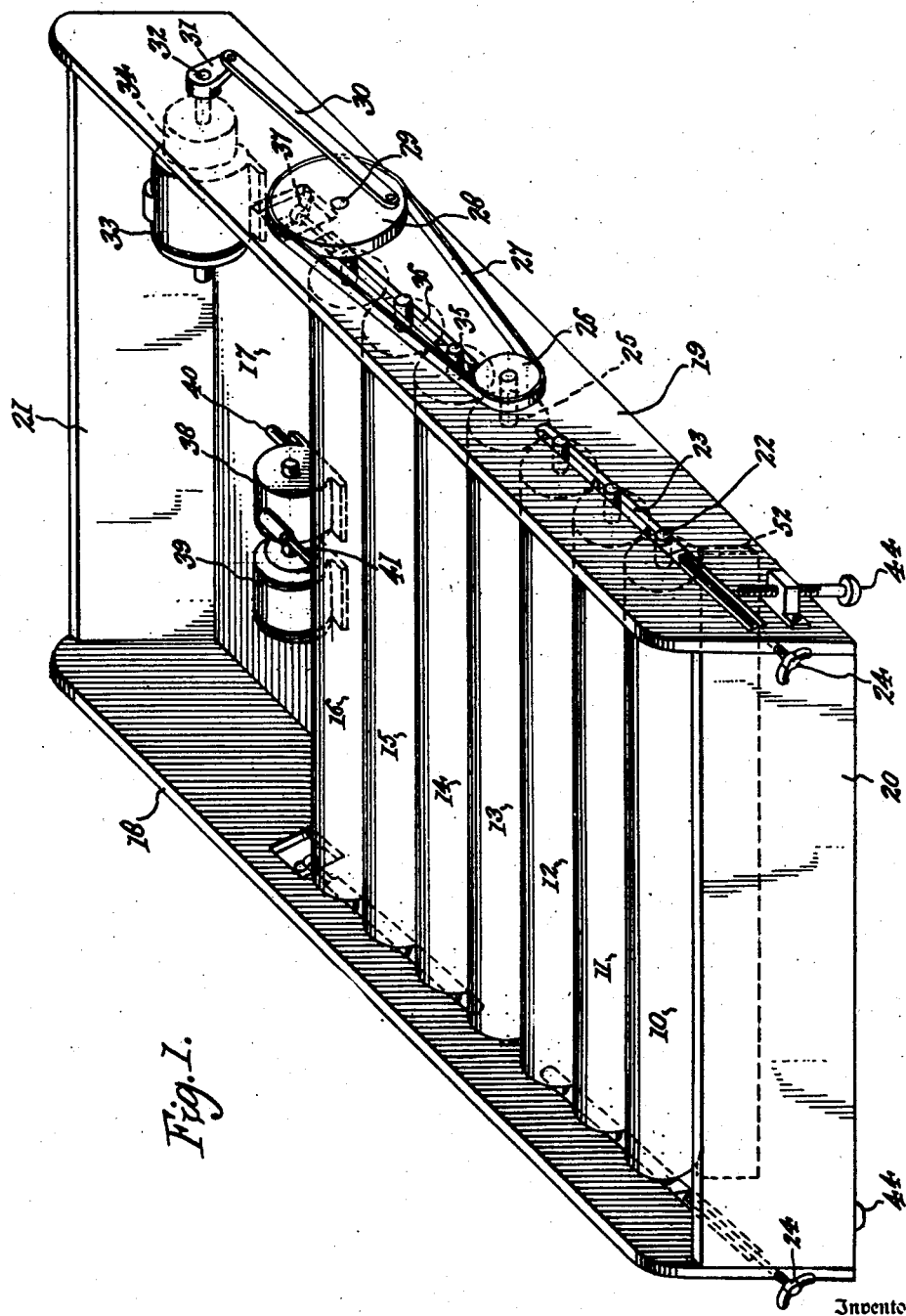

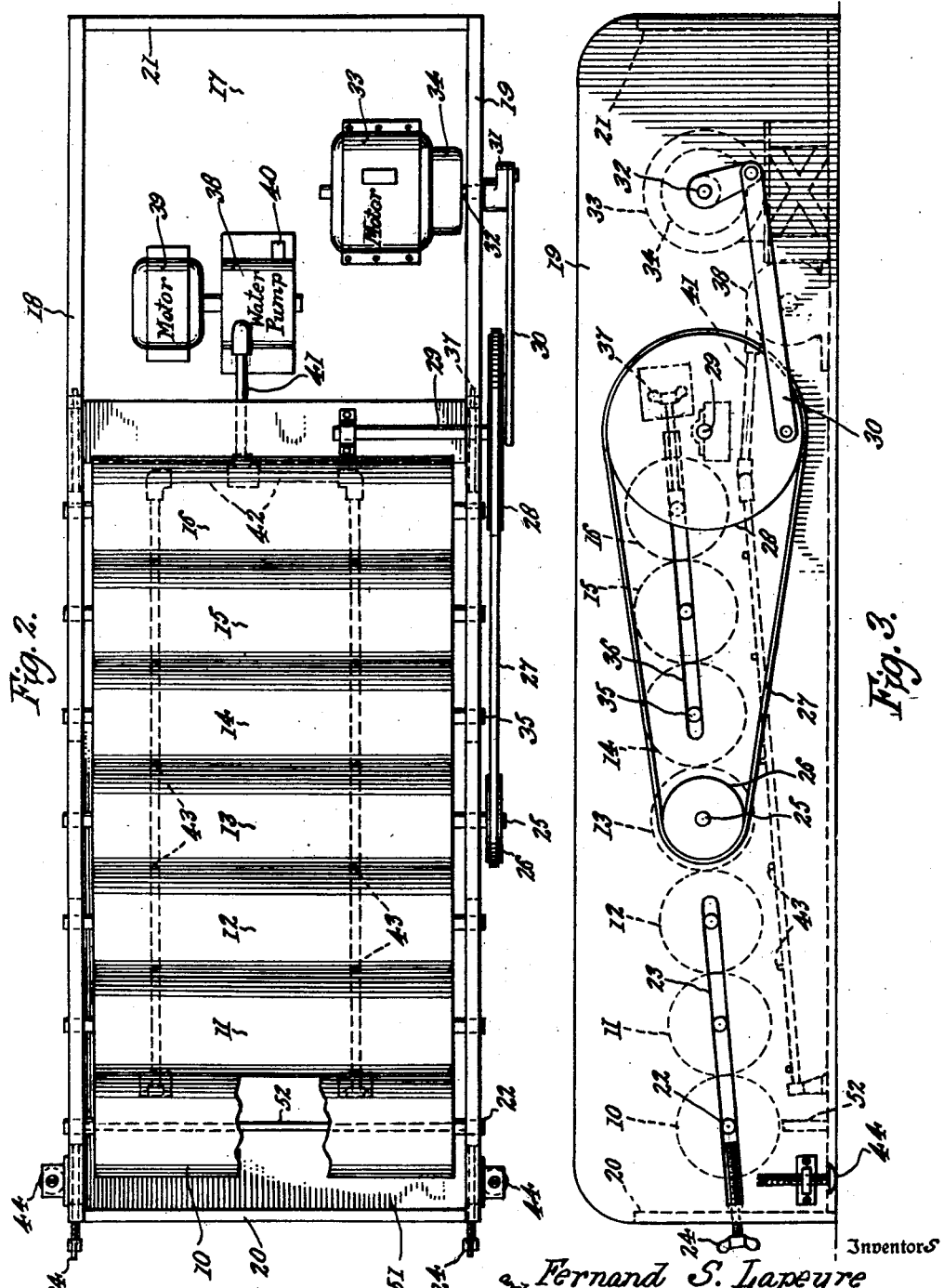

Inventors
Fernand S. Lapeyre
James Martial Lapeyre, III,
Wilkinson & Mawhinney
Attorneys

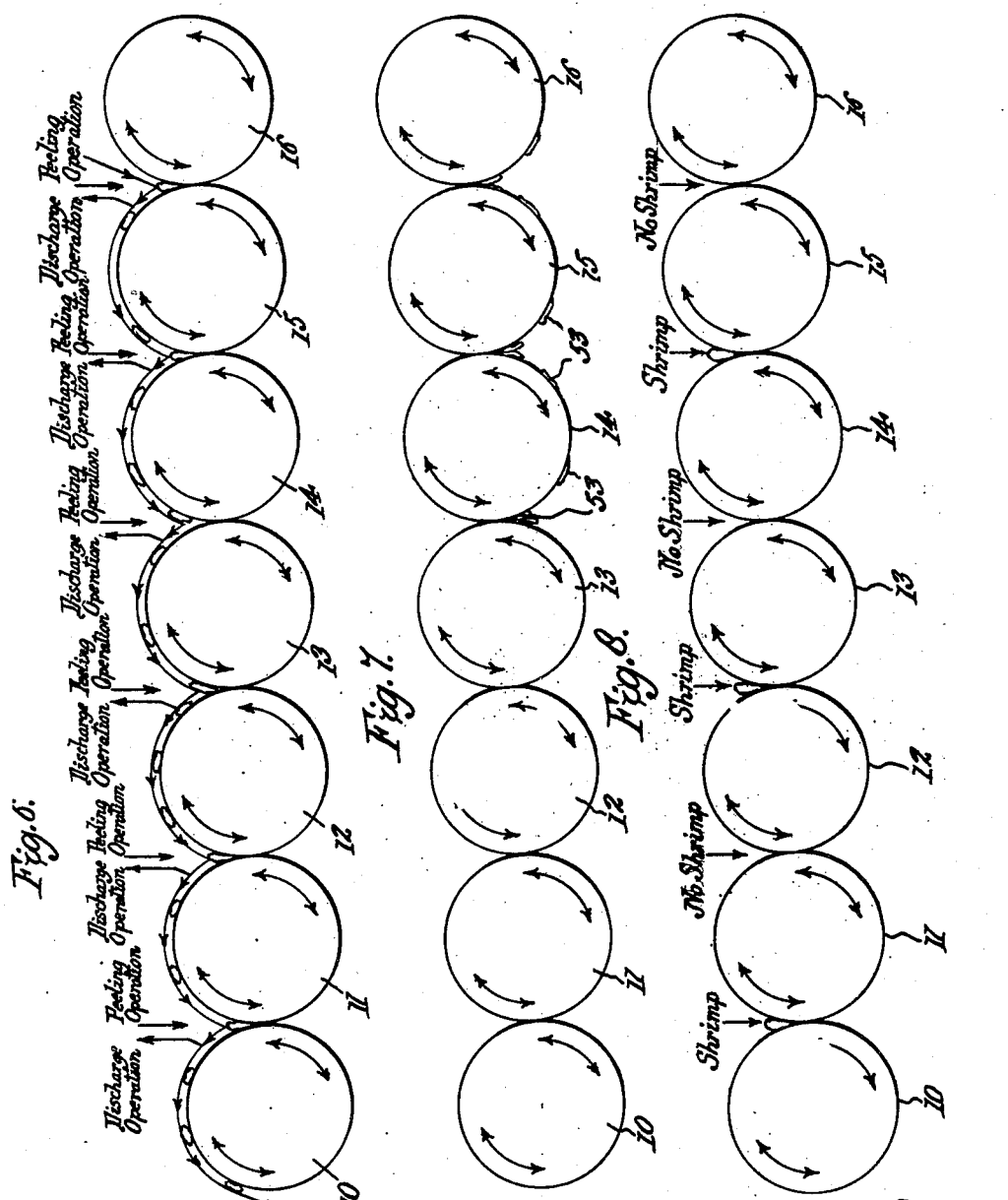

Patented Oct. 28, 1947

2,429,828

UNITED STATES PATENT OFFICE 2,429,828

SHRIMP PEELER

Fernand S. Lapeyre, New Orleans, and James Martial Lapeyre, III, Houma, La.

Application July 25, 1944, Serial No. 546,510

7 Claims. (Cl. 17—2)

The present invention relates to improvements in shrimp peelers and has for an object generally the expeditious, inexpensive, commercial peeling of shrimp.

In accordance with the invention, it has been discovered that when raw shrimp are held under pressure in the crotch of moving rollers of approximately two inches in diameter, placed one against the other under tension, and the rollers kept cleaned with water, the rollers will draw the peels and heads from the shrimp and carry these peels and heads between the rollers to the opposite side of the rollers, while holding the meats of the shrimp on the original or feeder side of the rollers without mutilating the same, the slippery meats not being accepted or caught by the rollers.

It was further discovered that if larger rollers are used, approximately three inches in diameter or larger, the angle of attack of the roller surface is such that no pressure is required on the shrimp itself, to secure peeling action by the rollers. If rollers are in horizontal or near horizontal position, the weight of the shrimp in the crotch of adjacent rollers is all the pressure that is required.

It has also been discovered that if rollers of relatively large diameter are used, say seven inches or larger, the angle of attack is so gradual that mutilation or mashing of the meats is encountered.

It has also been discovered that roller surface must be kept clean and free of slime, to insure proper peeling. It has also been discovered that with rollers arranged in a horizontal or near-horizontal plane, and with shrimp dropped thereon without pressure, the shrimp, usually somewhat curved in shape, fall into the roller crotch either back first or head and tail first. In the first case, only the peel from around the midsection is removed, while in the second case, the head and tail are removed, but not the midsection.

It has also been discovered that pressure or tension by the rollers is desirable in order to positively avoid the mutilation or mashing of the meat.

It is therefore a further object of the invention to construct a machine according to the discoveries and principles above set forth.

With the foregoing and other objects in view, the invention will be more fully described hereinafter and more particularly pointed out in the appended claims.

In the drawings, wherein like parts are denoted by the same reference characters throughout the several views, Figure 1 is a perspective view of an improved shrimp peeling machine constructed in accordance with the present invention;

Figure 2 is a top plan view of the same with a portion of one roller broken away to reveal the partitions below;

Figure 3 is a side elevation of such machine;

Figures 6, 7 and 8 are diagrammatic views of the rollers of the machine, illustrating the new mode of operation.

Figure 4:
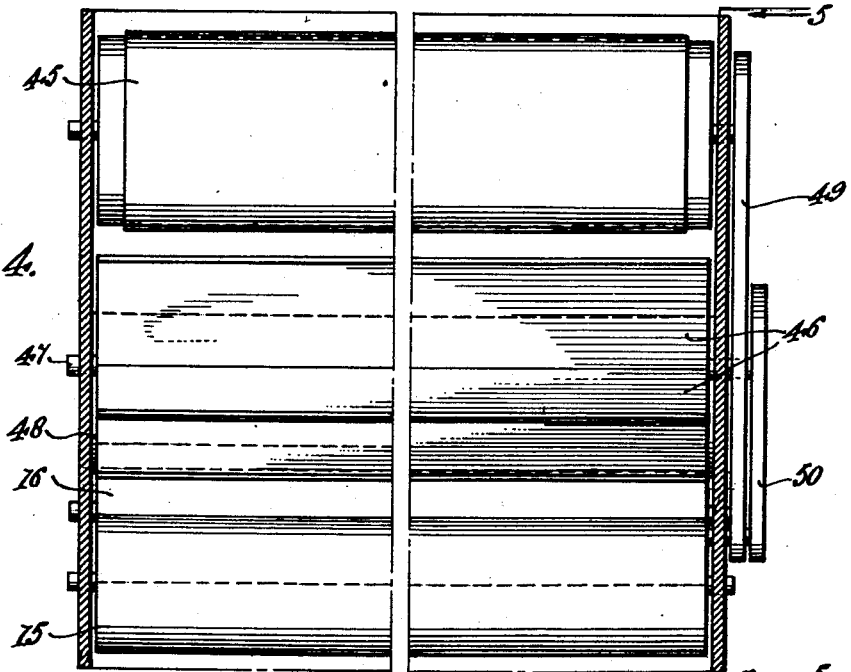
Figure 4 is a vertical section taken through the shrimp automatic feeding device.

Referring more particularly to the drawings, 10, 11, 12, 13, 14, 15 and 16 designate the rollers. Although these rollers are seven in number, which constitutes a satisfactory form of machine, any suitable number of rollers may be employed.

These rollers are mounted in a suitable box or tank composed of the bottom wall 17, the side walls 18 and 19 and the end walls 20 and 21. The trunnions 22 of rollers 10, 11 and 12, are journaled for sliding movement in slots 23 made in the side walls 18 and 19 and screw pressure devices 24 are mounted in the side walls 18 and 19 for adjusting the tension between the rollers 10, 11, 12 and 13.

The roller 13 has its trunnions 25 rotatably but non-slidably mounted in the walls 18 and 19 and one such trunnion is extended to be engaged by a drive disc 26 driven by a belt 27 from disc 28. The latter disc 28 is journaled on a shaft 29 mounted in one of the side walls 19. The disc 28 is oscillated through a link 30 from an arm 31 fast on a shaft 32 which is driven by an electric or other motor 33, preferably through an appropriate reduction gear 34.

The rollers 14, 15 and 16 have their trunnions 35 slidably and rotatably mounted in slots 36 made in the side walls 18 and 19 in alignment with the slots 23; and suitable adjustment screws of adjusting devices 37 engage the trunnions of the outermost or initial roller 16 and thus serve to tension all of the rollers including the nip or crotch between the rollers 13 and 14.

A water pump 38 is driven by an electric or other motor 39 and has its inlet 40 in communication with a source of clean water supply, while its outlet 41 connects with a pipe system 42 extending beneath the crotches of all of the rollers and having in alignment with said crotches, one or more nozzles 43. In the present instance, two such nozzles are arranged beneath the nip or crotch of each pair of rollers.

It will be observed, particularly from Figure 3, that the bank of rollers is arranged on an inclination, being stepped-down gradually from the highest initial roller 16 to the lowest final roller 10. To further adjust the inclination of the rollers, screw adjusting feet 44 are carried at the forward ends of the side walls 18 and 19.

Figure 5:
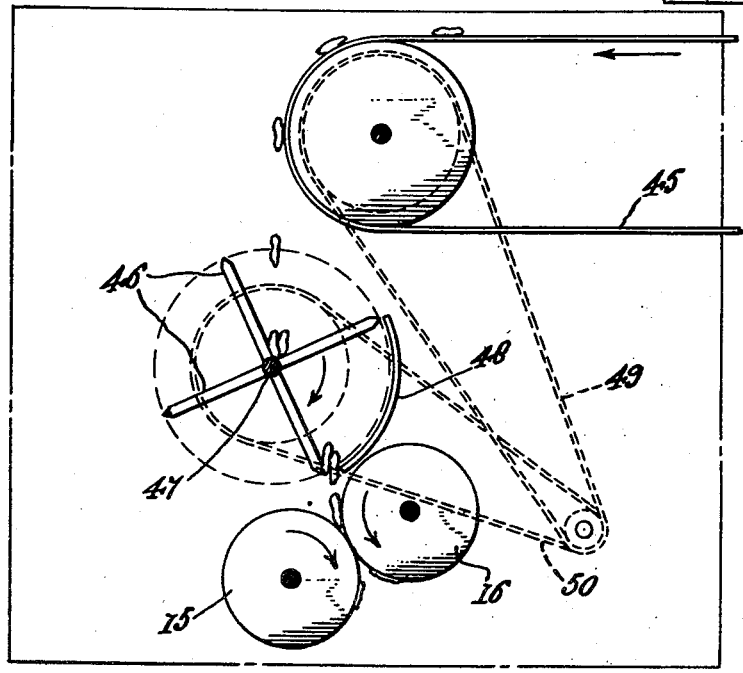
Figure 5 is a section through the automatic feeding device taken on the line 5—5 in Figure 4.

Referring more particularly to Figures 4 and 5, an automatic feeding device which may be used in connection with the improved peeler, is shown to consist of a substantially horizontal conveyor 45 by which the shrimp, from an appropriate source, are delivered to a distributing device composed of a number of radial partitions 46 fixed to a central shaft 47 and forming pockets therebetween, positioned to receive the shrimp dropping from the conveyor 45. The feeding device is arranged above the nip or crotch between the initial roller 16 and its companion 15, an arcuate shield 48 being so placed with reference to the circumference of the feeding device, that the shrimp are held in the rotating pockets until released at the lower edge of the shield 48. In effect, the partitions 46 combine with the lower edge of the shield 48 to form a delivery mouth positioned directly above the crotch between the rollers 15 and 16.

If desired, the rotary automatic feeding device may be driven in timed relation with and from the conveyor 45 by the use of belts 49 and 50.

In the use of the device, Figure 6 shows diagrammatically the inclination of the roller bank to the level or horizontal line and also illustrates the line of travel of the shrimp from roller to roller. The double pointed twin arcuate arrows on each roller indicate that the rollers are given an oscillating motion or a back and forth rotary motion through the link mechanism 30 heretofore described. This motion is communicated directly to the central drive roller 13, and is by it, communicated relatively reversely to the rollers 12 and 14 by reason of the pressure of contact of these rollers 12 and 14 upon diametrically opposite sides of the central drive roller 13. Similarly, the oscillating motion is communicated to the other rollers of the bank by peripheral pressure to which all of the rollers are subjected, by the screw devices 24 and 37.

Figure 7 shows the position of the peels 53 before removal by the jets of water.

Figure 8 shows that at any one time half the operations are peeling operations and half discharge operations. Every other crotch receiving and peeling shrimp while the balance or in-between crotches are discharging shrimp.

Peeling rollers are driven by friction and consequently adjoining rollers revolve in opposite directions when moved. Also, it must be observed that the direction of rotation of peeling rollers alternates from one direction to the opposite, except when rollers are all stopped at the moment when direction changes. Half of the rollers are revolving in opposite direction to the other half.

Figures 6, 7 and 8 indicate these directions of rotation as heretofore stated.

In Figure 6 the diagonal arrow above the crotch between rollers 15 and 16 indicates the introduction of the shrimp from the automatic feeding device; while the two vertical arrows above this crotch indicate the two directions of the oscillatory motion of the contacting surfaces of the rollers 15 and 16. When these contacting surfaces mutually move downward, they perform the peeling operation, drawing the peels and heads through to the bottom of the crotch, while rejecting the slippery meat. The other arrow pointed upwardly, indicates the reverse stroke of the contacting surfaces of rollers 15 and 16 showing the discharge operation, by which the heretofore rejected meat is carried to the left around and over the peripheral surface of the roller 15 and delivered to the next successive crotch between the rollers 14 and 15. Here it is also subjected to a second peeling operation when the contacting surfaces of the two rollers 14 and 15 move down together, and to a discharge operation when these contacting surfaces reverse their movement; in which event the roller 14, due to the inclination of the bank of rollers, receives the rejected meat and rolls it over on its discharge stroke to the next station which is between the contacting surfaces of the central drive roller 13 and the roller 14. Here the operations of peeling and discharging are repeated and the shrimp is transferred successively to the crotches between the remaining rollers.

The shrimp coming off to the left from the upper surface of the final roller 10 are delivered to a collection trough 51 provided between the end wall 20 and a partition 52 erected on the bottom 17 and extending up to the perimeter of the final roller 10.

When peeling operations are taking place at the crotch between rollers 15, 16, 13, 14 and 11, 12, discharging operations are taking place between the intermediate crotches and the end crotch between rollers 10, 11. When the direction of rollers reverses, the operations reverse respectively.

Shrimp are gathered in rotating feed troughs 46, 47 as they drop from conveyor belt 45, and by the trough they are dropped into the crotch of rollers 15 and 16, as indicated in Figure 5. The shrimp may fall into the crotch in any position. As to those which fall in feet first or head and tail first, the heads, feet and stomach sections and tail section are removed, leaving the back sections still to be removed. Those which fall in back first, have the back section removed, leaving the heads, feet and tail stomach sections still to be removed. The peels and heads are carried by the rollers to the underside (Fig. 7) where they are flushed off by a stiff spray of water provided by the pump 38. The half-peeled shrimp ride the crotch or upper side of the rollers without being mangled until the directions of the rollers reverse. When the directions of the rollers reverse, the rejected shrimp ride over roller 15 to the crotch of the rollers 14 and 15 where the second peeling operation takes place. In that operation are removed that portion of the peel and those heads which were not removed in the first operation. Because of the reversed direction of rollers and because shrimp has not changed its relative position on roller 15, the second operation attacks the opposite side of the shrimp worked on in the first operation. As the rollers 14 and 15 again reverse, the shrimp advances over the roller 14 to the next crotch for the third operation. The third operation, fourth, fifth, and sixth operations are the same as the operations above described.

These operations are applied because a certain percentage of the shrimp will not be completely peeled by the first and second operations alone and to provide for two or more shrimp overlapping when fed to rollers 15 and 16, in which case the first and second operations cannot fully complete the peeling job. The chances are remote however, that any shrimp will remain unpeeled after being subjected to additional operations three, four, five and six. After the sixth peeling operation, the shrimp is merely carried over the roller 10 and dropped into a suitable trough 51, which, by the aid of a slight stream of water, will carry the shrimp off and away from the machine.

The peels and heads of the shrimp are drawn through the rollers in each operation. Where the unpeeled or partly unpeeled shrimp are drawn into the crotch of the rollers, the peels so drawn tend to adhere to the rollers and must be disposed of by strong jets of water applied against the under sides of the rollers. Each roller makes from one and one-third to one and one-half revolutions before it reverses its direction of rotation, giving sufficient opportunity to accomplish all the peeling action possible, until the shrimp is changed to another position by the reverse action of the roller and the depositing of the shrimp into the next lower crotch.

The angle on which the roller bank slopes may be approximately thirty degrees (30°).

It will be appreciated from the foregoing that the machine will peel shrimp of various sizes and separate the shrimp meats from the peels and heads.

We have successfully used rubber rollers and rubber covered wood rollers. However, we do not feel that such material is necessarily essential.

While we have shown rollers all of one diameter, it may be found desirable to include rollers of different sizes on the same machine and we reserve the right to make this change. While we have illustrated and described a single embodiment of the present invention as the best form of machine known to us at the present time, it is to be understood that this is merely for illustrative purposes and that the invention is susceptible of embodiment in many mechanical forms, provided such forms are within the scope of the following claims.

What is claimed is:

1. A shrimp peeling machine comprising a pair of rollers so positioned relatively to one another as to provide a crotch for receiving raw shrimp, means whereby said rollers are oscillated in relatively reversed directions to pinch the peels through and beyond the crotch, and means whereby a jet of water at high velocity is directed against the under portions of said rollers to carry off the removed peels.

2. A shrimp peeling machine comprising a central driven oscillatory roller, associate rollers at opposite sides of said driven roller, means for putting pressure upon all of said rollers to cause oscillatory drive of all of said rollers derived from the motion of said driven roller, said rollers arranged on an inclination, means for feeding raw shrimp to the crotch between the highest roller and its next successive companion roller, and means for receiving the peeled shrimp meat from the lower-most roller area.

3. A machine as claimed in claim 2, further comprising water jets placed below the crotches of said rollers, and means for delivering water under pressure to said jets.

4. A shrimp peeling machine according to claim 2 wherein the rollers are journaled in a tank containing water for flushing off the peels and heads washed from the lower portions of the rollers.

5. A shrimp peeling machine according to claim 2 characterized by a tank in which said rollers are journaled, and means for tilting one end portion of said tank to adjust the line of inclination of said rollers.

6. A shrimp peeling machine according to claim 2 in which the trunnions of all of the associate rollers are mounted in slots in a supporting structure and screw pressure devices operate on said trunnions to force the rollers together and toward the central drive roller.

7. A shrimp peeling machine according to claim 2 in which one of the trunnions of the central drive roller carries a disc or pulley driven by a belt from an oscillatory drive disc, a pitman pivoted to said drive disc, a rotary arm connected to the other end of said pitman and motor means for rotating said arm.

FERNAND S. LAPEYRE.
JAMES MARTIAL LAPEYRE, III.

REFERENCES CITED

The following references are of record in the file of this patent:

UNITED STATES PATENTS

| Number | Name | Date |
| --- | --- | --- |
| 546,891 | King | Sept. 24, 1895 |
| 1,147,756 | Sells | July 27, 1915 |
| 1,990,503 | Sells et al. | Feb. 12, 1935 |
| 2,034,691 | Bottker et al. | Mar. 24, 1936 |
| 2,335,588 | Fox | Nov. 30, 1943 |
| 2,362,356 | Crawford | Nov. 7, 1944 |